United States Patent
Ejima et al.

(10) Patent No.: US 10,494,013 B2
(45) Date of Patent: Dec. 3, 2019

(54) METHOD FOR ADJUSTING STEERING SYSTEM AND ADJUSTMENT APPARATUS FOR STEERING SYSTEM

(71) Applicant: JTEKT CORPORATION, Osaka-shi, Osaka (JP)

(72) Inventors: Toshikatsu Ejima, Okazaki (JP); Manabu Igarashi, Okazaki (JP); Hisayuki Furui, Chiryu (JP)

(73) Assignee: JTEKT CORPORATION, Osaka-shi (JP)

( * ) Notice: Subject to any disclaimer, the term of this patent is extended or adjusted under 35 U.S.C. 154(b) by 516 days.

(21) Appl. No.: 14/973,172

(22) Filed: Dec. 17, 2015

(65) Prior Publication Data

US 2016/0185382 A1   Jun. 30, 2016

(30) Foreign Application Priority Data

Dec. 24, 2014 (JP) .................................. 2014-260916

(51) Int. Cl.
  *B62D 3/00* (2006.01)
  *B62D 3/12* (2006.01)
  *B62D 3/02* (2006.01)

(52) U.S. Cl.
  CPC ............... *B62D 3/123* (2013.01); *B62D 3/00* (2013.01); *B62D 3/02* (2013.01)

(58) Field of Classification Search
  CPC ........................... Y10T 29/49488; B62D 3/123
  See application file for complete search history.

(56) References Cited

U.S. PATENT DOCUMENTS

| | | | |
|---|---|---|---|
| 5,544,522 A | 8/1996 | Little | |
| 2014/0020493 A1* | 1/2014 | Nakamura | F16H 57/021 74/422 |

FOREIGN PATENT DOCUMENTS

| | | |
|---|---|---|
| CN | 101 672 359 A | 3/2010 |
| DE | 103 54 776 A1 | 6/2005 |
| DE | 10 2006 052376 A1 | 5/2008 |
| EP | 0 709 275 A2 | 5/1996 |
| GB | 1 478 929 A | 7/1977 |
| JP | S50-66000 A | 6/1975 |
| JP | H01-83668 U | 6/1989 |
| JP | H08-225083 A | 9/1996 |
| JP | 2008-018828 A | 1/2008 |

OTHER PUBLICATIONS

Apr. 26, 2016 Extended Search Report issued in European Patent Application No. 15 20 1280.3.
Aug. 21, 2018 Office Action issued in Japanese Application No. 2014-260916.

* cited by examiner

*Primary Examiner* — Rick K Chang
(74) *Attorney, Agent, or Firm* — Oliff PLC

(57) ABSTRACT

A method for adjusting a steering system and an adjustment apparatus for a steering system are provided which allow a clearance between a support yoke and a yoke plug to be appropriately set. When a yoke plug is loosened which has been temporarily fastened to a degree that a support yoke is subjected to elastic compressive deformation, the yoke plug is loosened to a position where a clearance C between the support yoke and the yoke plug reaches a target clearance using, as a reference, a position where a rate of a change in an axial position of the yoke plug with respect to an angular position of the yoke plug increases rapidly.

4 Claims, 5 Drawing Sheets

US 10,494,013 B2

METHOD FOR ADJUSTING STEERING SYSTEM AND ADJUSTMENT APPARATUS FOR STEERING SYSTEM

INCORPORATION BY REFERENCE

The disclosure of Japanese Patent Application No. 2014-260916 filed on Dec. 24, 2014 including the specification, drawings and abstract, is incorporated herein by reference in its entirety.

BACKGROUND OF THE INVENTION

1. Field of the Invention

The present invention relates to a method for adjusting a steering system and an adjustment apparatus for a steering system.

2. Description of Related Art

A rack-and-pinion steering system has been known as described in, for example, Japanese Patent Application Publication No. 2008-018828 (JP 2008-018828 A). The steering system has a pinion shaft that rotates in conjunction with a steering wheel, a rack shaft that meshes with the pinion shaft, and a housing that houses both the pinion shaft and the rack shaft. The rack shaft moves in an axial direction thereof in conjunction with rotation of the pinion shaft to allow the direction of wheels to be changed.

The steering system includes a support mechanism for eliminating backlash between the rack shaft and the pinion shaft. The support mechanism has a support yoke provided in a holding hole of the housing so as to be able to move back and forth, a yoke plug screw-threaded into the holding hole, and a compression coil spring interposed between the yoke plug and the support yoke. The support yoke is constantly biased toward the rack shaft by an elastic force of the compression coil spring. The support yoke supports the rack shaft so that the rack shaft is slidable along the axial direction thereof while pressing the rack shaft toward a pinion.

To suppress hammering sound resulting from abutting contact between the support yoke and the yoke plug, a predetermined amount of clearance is provided between the support yoke and the yoke plug. For strict management, the clearance is adjusted, for example, as follows. First, the yoke plug is temporarily fastened to the holding hole to the degree that the yoke plug comes into abutting contact with the support yoke.

Subsequently, the yoke plug is loosened until the clearance reaches a target clearance.

However, this method for adjusting the clearance raises the following concerns. Although the clearance is preferably adjusted using, as a reference, a zero clearance position that is the position where the yoke plug just comes into abutting contact with the support yoke, whether the yoke plug is located at a true zero clearance position is not known. Furthermore, when the yoke plug is temporarily fastened, the zero clearance position may vary among products. The variation in zero clearance position may lead to a variation in adjusted clearance.

SUMMARY OF THE INVENTION

An object of the present invention is to provide a method for adjusting a steering system and an adjustment apparatus for a steering system that allow a clearance between a support yoke and a yoke plug to be appropriately set.

An aspect of the present invention provides a method for adjusting a steering system including loosening a yoke plug, which has been temporarily fastened, to a degree that a support yoke is subjected to elastic compressive deformation. The steering system includes a rack shaft that makes linear motion inside a housing, a pinion shaft rotatably supported by the housing to mesh with the rack shaft, the support yoke housed in a guide hole provided in the housing so as to be able to move back and forth along the guide hole and supporting the rack shaft so as to allow the rack shaft to slide along an axial direction of the rack shaft, the yoke plug fixed with screw-threaded in the guide hole, and a bias member interposed between the yoke plug and the support yoke to bias the support yoke toward the rack shaft. In the loosening of the yoke plug, the yoke plug is loosened to a position where an axial position of the yoke plug reaches a target clearance between the support yoke and the yoke plug using, as a reference, a position where a rate of a change in the axial position of the yoke plug with reference to the support yoke increases rapidly with respect to a change in an angular position of the yoke plug When the temporarily fastened yoke plug is loosened to the degree that the support yoke is subjected to elastic compressive deformation, the axial position of the support yoke initially increases slowly with respect to an increase in the angular position of the support yoke as the compressive deformation of the support yoke is released. After the compressive deformation of the support yoke is released, the axial position of the support yoke increases rapidly with respect to the increase in the angular position of the support yoke. This is because the axial position of the yoke plug increases with respect to the increase in angular position of the yoke plug according to a screw pitch.

Based on this, in the above-described adjustment method, the yoke plug is loosened to the position where the axial position of the yoke plug reaches the target clearance using, as a reference, a position where the compressive deformation of the support yoke is released (what is called a zero clearance position). Thus, the clearance between the support yoke and the yoke plug can be made closer to the target clearance. Therefore, a more appropriate clearance can be set.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the present invention will be described.

Figure 1:
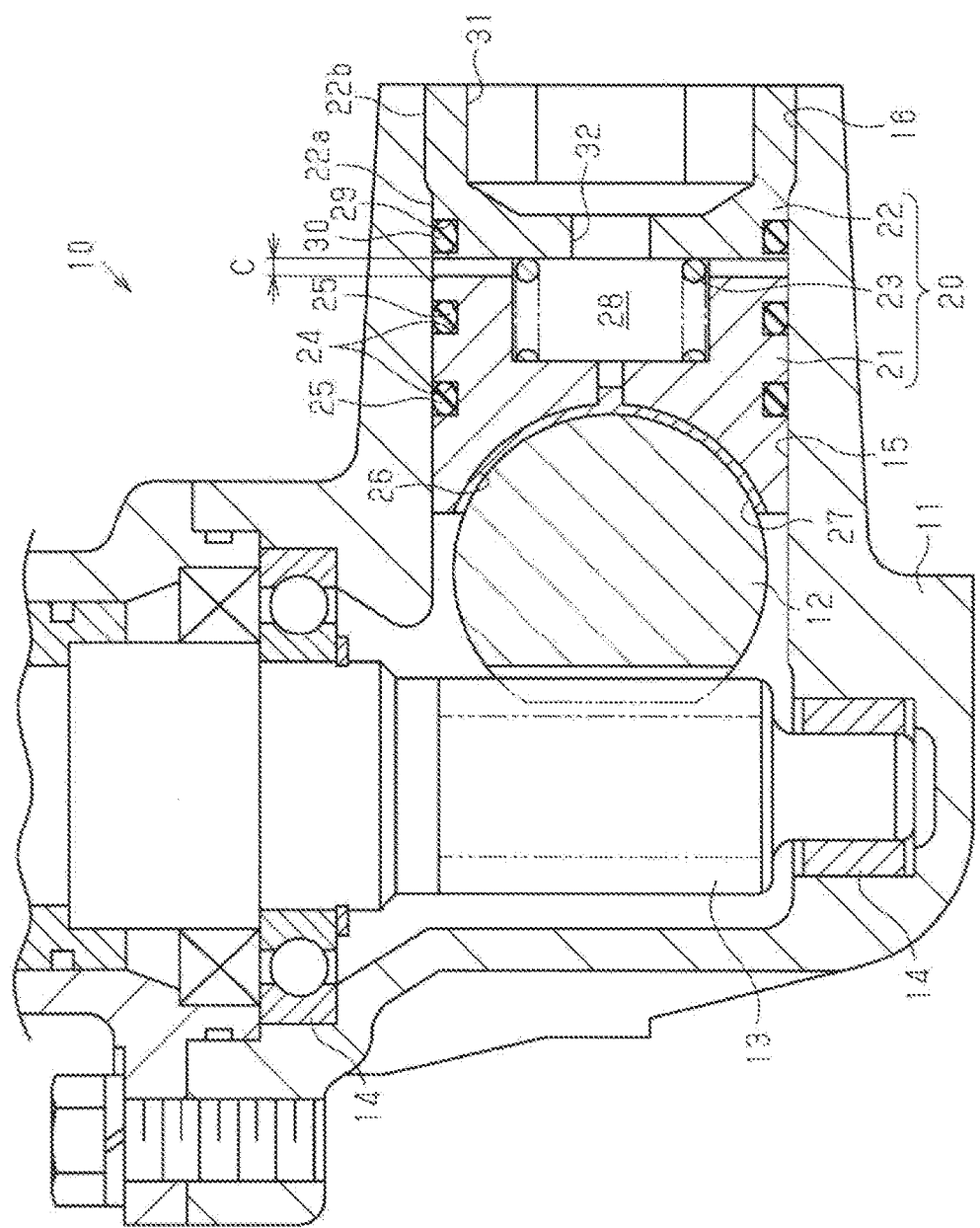
FIG. 1 is a sectional view depicting an embodiment of a steering system.

As depicted in FIG. 1 representing a general configuration of a steering system to which the present invention is applied, a steering system 10 has a housing 11 fixed to a vehicle body. A rack shaft 12 passes through the housing 11. The rack shaft 12 is supported so as to be slidable along an axial direction thereof (the direction orthogonal to the sheet of FIG. 1) with respect to the housing 11 A pinion shaft 13 extending along a direction crossing the rack shaft 12 (an up-down direction in FIG. 1) passes through the housing 11. The pinion shaft 13 is supported via a bearing 14 so as to be rotatable with respect to the housing 11. The pinion shaft 13 rotates in conjunction with an operation of the steering wheel (not depicted in the drawings). The rack shaft 12 moves in the axial direction thereof in conjunction with the rotation of the pinion shaft 13 to change the direction of wheels (not depicted in the drawings).

In the housing 11, in an area on the opposite side of the rack shaft 12 from the pinion shaft 13, a cylindrical guide hole 15 is formed which extends along a direction orthogonal to the rack shaft 12 (a lateral direction in FIG. 1). The guide hole 15 is open toward the outside of the housing 11.

In an inner peripheral surface of the guide hole 15, an internal thread portion 16 is formed at an end of the guide hole 15 on the opening side. Inside the guide hole 15, a support mechanism 20 is provided which allows the rack shaft 12 to be pressed against the pinion shaft 13.

The support mechanism 20 has a support yoke 21 that supports a peripheral surface of the rack shaft 12 such that the rack shaft 12 is slidable, a yoke plug 22 screw-threaded in the internal thread portion 16 of the guide hole 15, and a compression coil spring 23 interposed between the support yoke 21 and the yoke plug 22 to serve as a bias member.

The support yoke 21 is formed of a metal material such as aluminum and shaped to be cylindrical. The support yoke 21 moves back and forth along a depth direction of the guide hole 15. An outer peripheral surface of the support yoke 21 is slidably guided on an inner peripheral surface of the guide hole 15. Two annular grooves 24 and 24 are formed in the outer peripheral surface of the support yoke 21. O rings 25 and 25 are fitted in the grooves 24 and 24. The O rings 25 and 25 elastically contact the inner peripheral surface of the guide hole 15 to seal between the inner peripheral surface of the guide hole 15 and the outer peripheral surface of the support yoke 21. The O rings 25 and 25 elastically support the support yoke 21 in a radial direction thereof. This suppresses possible backlash of the support yoke 21.

In a side surface of the support yoke 21, which is closer to the rack shaft 12 (a left side surface in FIG. 1), a recessed surface (circular arc surface) 26 is formed which is shaped along a peripheral surface of the rack shaft 12. A sheet 27 that slidably contacts the rack shaft 12 is attached to the recess surface 26. The sheet 27 is formed of a metal material, for example, bronze.

A spring housing hole 28 is formed in a side surface of the support yoke 21, which is away from the rack shaft 12 (a right side surface in FIG. 1). One end (a left end in FIG. 1) of the compression coil spring 23 is inserted in the spring housing hole 28. Thus, the compression coil spring 23 is restrained from moving in a radial direction thereof. The support yoke 21 is constantly biased toward the rack shaft 12 by an elastic force of the compression coil spring 23 interposed between an inner bottom surface of the spring housing hole 28 and a side surface of the yoke plug 22, which is closer to the support yoke 21 (a left side surface in FIG. 1). The recessed surface 26 is pressed against the peripheral surface of the rack shaft 12 via the sheet 27 such that the rack shaft 12 is slidable.

The yoke plug 22 is formed of a metal material such as steel and shaped to be cylindrical. A cylindrical surface 22a and an external thread portion 22b are formed on an outer peripheral surface of the yoke plug 22 in this order from the support yoke 21 side. An annular groove 29 is formed in the cylindrical surface 22a. An O ring 30 is fitted in the groove 29.

An engagement hole 31 is formed in a side surface of the yoke plug 22, which is away from the support yoke 21 (a right side surface in FIG. 1). The engagement hole 31 engages with a tool (not depicted in the drawings) used to rotationally operate the yoke plug 22. An appropriate shape such as a hexagon or a dodecagon may be adopted for the engagement hole 31 depending on the shape of the tool. A through-hole 32 is formed in a bottom wall of the yoke plug 22. The through-hole 32 allows the inside and the outside of the engagement hole 31 to communicate with each other. The yoke plug 22 is fixed in the housing 11 by inserting, into the guide hole 15, an end of the yoke plug 22 at which the cylindrical surface 22a is formed, while fastening the external thread portion 22b to the internal thread portion 16.

A clearance C is provided between the side surface of the support yoke 21, which is closer to the yoke plug 22 (the right side surface in FIG. 1) and the side surface of the yoke plug 22, which is closer to the support yoke 21 (the left side surface in FIG. 1). The amount of the clearance C is strictly managed through adjustment of a position to which the yoke plug 22 is screw-threaded.

Now, an adjustment apparatus for the clearance will be described. The clearance C is adjusted using, for example, an adjustment apparatus described below. The adjustment apparatus is used in an adjustment step for the clearance C included in assembly steps for the steering system 10.

Figure 2:
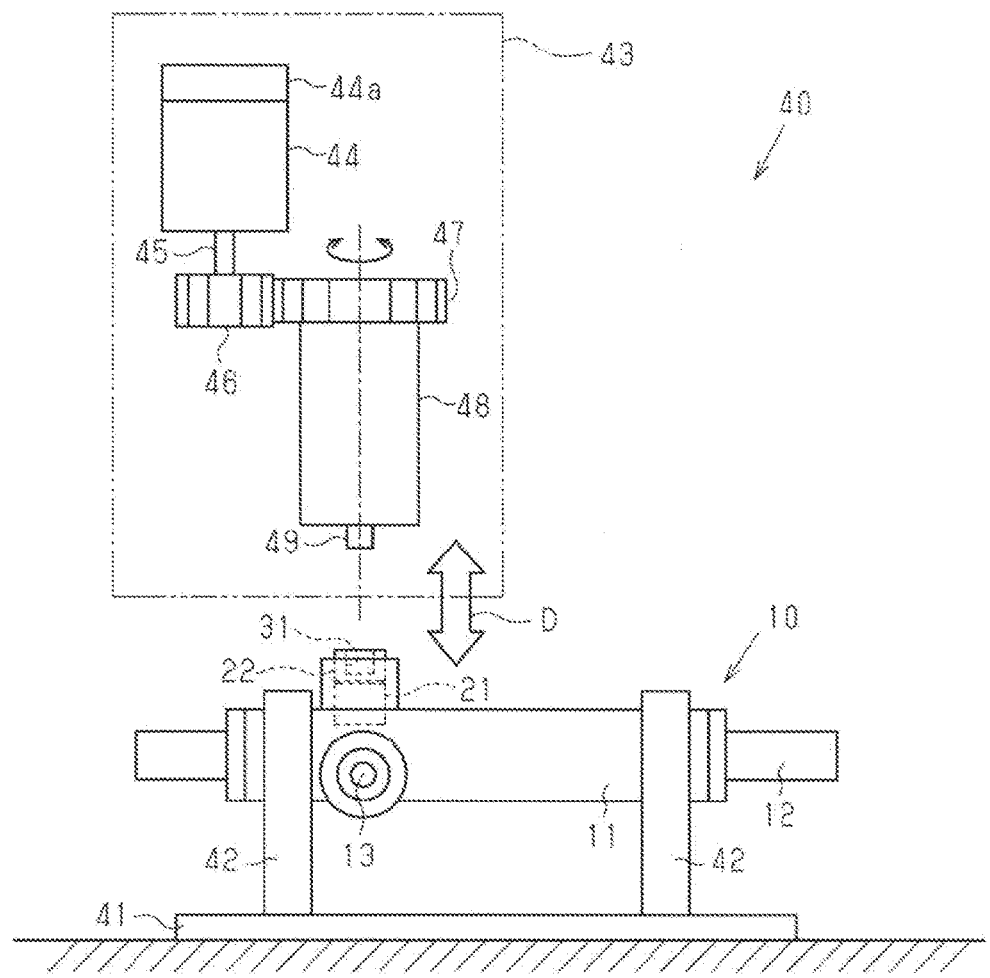
FIG. 2 is a front view depicting an example of an adjustment apparatus for the steering system.

As depicted in FIG. 2, an adjustment apparatus 40 has a base 41, two support legs 42 and 42 provided on the base to support the steering system 10, and a driving unit 43 that rotates the yoke plug 22.

The two support legs 42 and 42 support both ends of the housing 11 of the pre-assembled steering system 10. In this regard, the steering system 10 is kept in an orientation in which, for example, the guide hole 15 faces opposite to the base 41 (upward in FIG. 1).

The driving unit 43 is provided, for example, in a frame (not depicted in the drawings) that forms a framework of the adjustment apparatus 40. As depicted by a blank arrow in FIG. 2, the driving unit 43 moves along a lifting direction D that is a direction in which the driving unit 43 moves toward and away from the base 41 through operation of a lifting mechanism (not depicted in the drawings).

The driving unit 43 has a motor 44, a driving gear 46 fixed to an output shaft 45 of the motor 44, a driven gear 47 that meshes with the driving gear 46, and a rotating socket 48 coupled to the driven gear 47. The motor 44 is provided with a rotation sensor 44a. The driven gear 47 is provided at an end of the rotating socket 48, which is on the opposite side of the driven gear 47 from the base 41 (an upper end in FIG. 2).

At an end of the rotating socket 48, which is on the base 41 side (a lower end in FIG. 2), an engaging protruding portion 49 is provided which functions as a tool that engages with the engagement hole 31 in the yoke plug 22. For the engaging protruding portion 49, an appropriate shape such as a hexagonal prism or a dodecagonal prism may be adopted which corresponds to the shape of the engagement hole 31. When the clearance C is adjusted, the driving unit 43 is lowered to insert the engaging protruding portion 49 into the engagement hole 31 in the yoke plug 22. Thus, the yoke plug 22 can rotate integrally with the rotating socket 48. This is because the engaging protruding portion 49 engages with the engagement hole 31 in a rotating direction of the engaging protruding portion 49.

Now, the rotating socket 48 will be described in detail.

Figure 3:
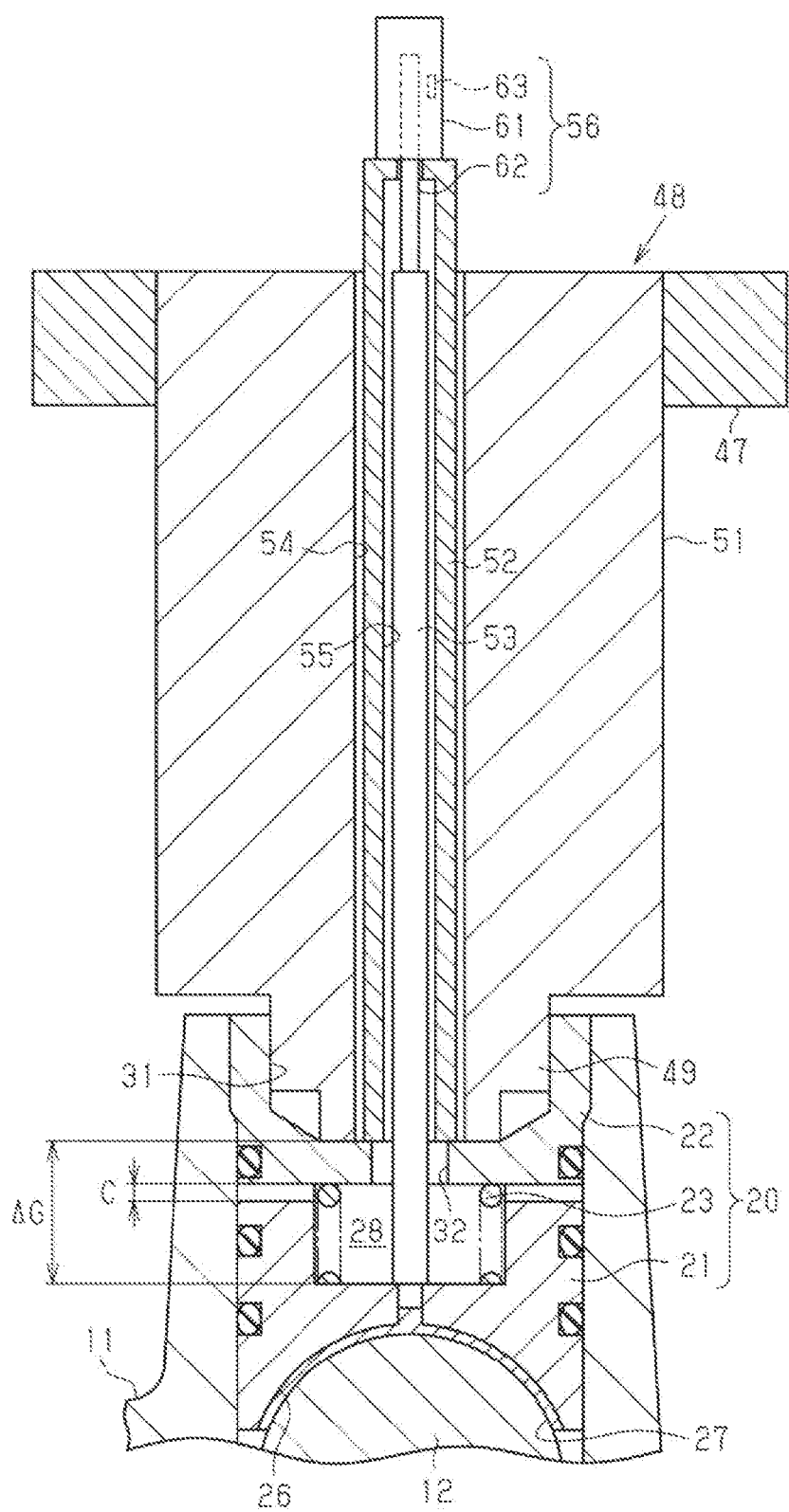
FIG. 3 is a sectional view depicting an important part of the adjustment apparatus for the steering system.

As depicted in FIG. 3, the rotating socket 48 has a cylindrical socket member 51, a cylindrical reference member 52, and a rod-like gauge head 53.

The socket member 51 has a through-hole 54 extending along an axial direction of the socket member 51. The reference member 52 is inserted into the through-hole 54. The reference member 52 is movable along an axial direction thereof and relative to the socket member 51. Although not depicted in the drawings, a retaining structure is preferably provided between the reference member 52 and the socket member 51 to regulate falling of the reference member 52. The length of the reference member 52 in the axial direction is set larger than the length of the socket member 51 in the axial direction. Thus, when a tip portion of the engaging protruding portion 49 is in abutting contact with the inner bottom surface of the yoke plug 22, a leading end (a lower end in FIG. 3) of the reference member 52 is in abutting contact with the inner bottom surface of the yoke plug 22 while a trailing end (an upper end in FIG. 3) of the reference member 52 protrudes from a trailing end surface (an end surface away from the yoke plug 22).

When a screw-thread position of the yoke plug 22 is changed, the reference member 52 moves along the axial direction together with the yoke plug 22. During the movement, the leading end of the reference member 52 is also kept in abutting contact with the inner bottom surface of the yoke plug 22. For example, when the yoke plug 22 is fastened, the yoke plug 22 moves closer to the support yoke 21 and the reference member 52 moves closer to the support yoke 21 along with the yoke plug 22 by gravity. When the yoke plug 22 is loosened, the yoke plug 22 moves away from the support yoke 21 and the reference member 52 is pushed up by the yoke plug 22 to move away from the support yoke 21 along with the yoke plug 22.

The reference member 52 is shaped like a bottomed cylinder that is occluded at a trailing end portion thereof (an upper end portion in FIG. 3). The reference member 52 has an insertion hole 55 extending in the axial direction of the reference member 52. The gauge head 53 passes through the insertion hole 55. The gauge head 53 is movable along an axial direction thereof and relative to reference member 52. Although not depicted in the drawings, a retaining structure is preferably provided between the gauge head 53 and the reference member 52 to regulate falling of the gauge head 53. The length of the gauge head 53 in the axial direction is set slightly larger than the length of the reference member 52 in the axial direction. Thus, with the tip portion of the engaging protruding portion 49 in abutting contact with the inner bottom surface of the yoke plug 22, a leading end of the gauge head 53 extends through the through-hole 32 in the yoke plug 22 and is in abutting contact with an inner bottom surface of the spring housing hole 28. Regardless of the screw-thread position of the yoke plug 22, the gauge head 53 is kept in abutting contact with the inner bottom surface of the spring housing hole 28 by gravity.

A linear gauge 56 serving as a displacement sensor is provided at the trailing end (the upper end in FIG. 3) of the reference member 52. The linear gauge 56 has a case 61 fixed to the reference member 52, a spindle 62 protruding from an end of the case 61 on the reference member 52 side, and a detector 63 provided inside the case 61.

The spindle 62 is movable along an axial direction thereof and relative to the case 61. A tip portion (a lower end in FIG. 3) of the spindle 62 penetrates a trailing end wall (an upper end wall in FIG. 3) of the reference member 52 with play around the spindle 62 and is inserted into the reference member 52 (into the insertion hole 55). Inside the reference member 52, the tip portion of the spindle 62 is in abutting contact with the upper end of the gauge head 53.

With the tip portion of the engaging protruding portion 49 in abutting contact with the inner bottom surface of the yoke plug 22, the spindle 62 basically does not move. For example, when the reference member 52 moves closer to the support yoke 21 (downward in FIG. 3), the case 61 moves closer to the support yoke 21 along with the reference member 52. In contrast, the spindle 62 is in abutting contact with the inner bottom surface of the yoke plug 22 via the gauge head 53. Thus, the spindle 62 is prevented from moving closer to the support yoke 21 and the spindle 62 enters the case 61 relative to the case 61.

When the reference member 52 moves away from the support yoke 21 (upward in FIG. 3), the case 61 moves away from the support yoke 21 along with the reference member 52. In contrast, the spindle 62 is movable relative to the case 61 and is kept in abutting contact with the upper end of the gauge head 53 by gravity. Thus, the spindle 62 is prevented from moving away from the support yoke 21. The spindle 62 extends relative to the case 61. The tip portion of the spindle 62 may be coupled to the upper end of the gauge head 53.

The detector 63 generates an electric signal corresponding to the position of the spindle 62 with respect to the reference member 52. The position of the spindle 62 with respect to the reference member 52 is equal to the position of the reference member 52 with reference to the inner bottom surface of the spring housing hole 28 and therefore to the axial position of the yoke plug 22 with reference to the support yoke 21. The axial position of the yoke plug 22 is represented by a gap ΔG between a leading end surface (a lower end surface in FIG. 3) of the reference member 52 and a leading end surface (a lower end surface in FIG. 3) of the gauge head 53.

Figure 4:
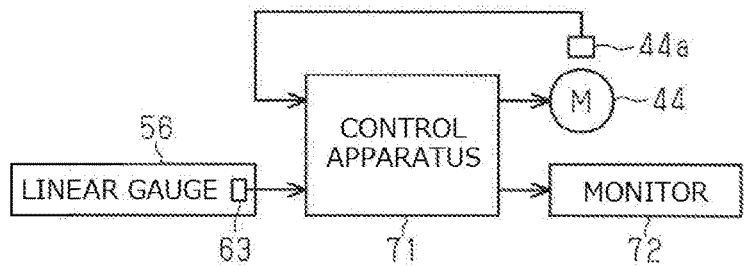
FIG. 4 is a block diagram depicting an electrical configuration of the adjustment apparatus for the steering system.

Now, an electrical configuration of the adjustment apparatus 40 will be described. As depicted in FIG. 4, the adjustment apparatus 40 has a control apparatus 71 and a monitor 72. The control apparatus 71 integrally controls various portions of the adjustment apparatus 40. The control apparatus 71 is connected to the linear gauge 56 and to the rotation sensor 44a. The control apparatus 71 is also connected to the motor 44 and to the monitor 72. The monitor 72 displays various pieces of information through display control.

The control apparatus 71 controls driving of the motor 44. The control apparatus 71 calculates the rotation amount of the motor 44 and thus the angular position θ of the yoke plug 22 with respect to the housing 11 based on an electric signal generated by the rotation sensor 44a. Moreover, based on an electric signal generated by the linear gauge 56 (to be exact, the detector 63), the control apparatus 71 calculates the gap ΔG between the leading end surface of the reference member 52 and the leading end surface of the gauge head 53, in other words, the axial position G of the yoke plug 22 with reference to the support yoke 21. The control apparatus 71 executes an adjustment process for the clearance C based on the relationship between the angular position θ of the yoke plug 22 and the axial position G of the yoke plug 22. In executing the adjustment process for the clearance C, the control apparatus 71 allows the monitor 72 to display a graph representing the relationship between the angular position θ of the yoke plug 22 and the axial position G of the yoke plug 22.

Now, a method for adjusting the clearance C will be described. The control apparatus 71 executes the adjustment process for the clearance C in accordance with a control program stored in a storage apparatus not depicted in the drawings. The adjustment process corresponds to one of the assembly steps for the steering system.

With the yoke plug 22 temporarily fastened in the guide hole 15 in advance, the steering system 10 is set between the two support legs 42 and 42 of the adjustment apparatus 40. At this time, the yoke plug 22 is kept in abutting contact with the support yoke 21. In this case, the clearance C between the yoke plug 22 and the support yoke 21 is zero, but the yoke plug 22 is expected to be fastened beyond a zero clearance position (zero touch position) to a zero clearance excess position to elastically compress the support yoke 21. In this case, the yoke plug 22 is assumed to be temporarily fastened to the degree that the support yoke 21 is subjected to elastic compressive deformation.

The zero clearance position refers to the position where the yoke plug 22 just comes into contact with the support yoke 21 and where the axial force (pressing force) of the yoke plug 22 is prevented from acting on the support yoke 21, which is thus subjected to no compressive deformation. The zero clearance excess position refers to a position where the yoke plug 22 is continuously fastened after coming into contact with the support yoke 21 to exert the axial force of the yoke plug 22 on the support yoke 21, which is thus subjected to compressive deformation.

Figure 5:
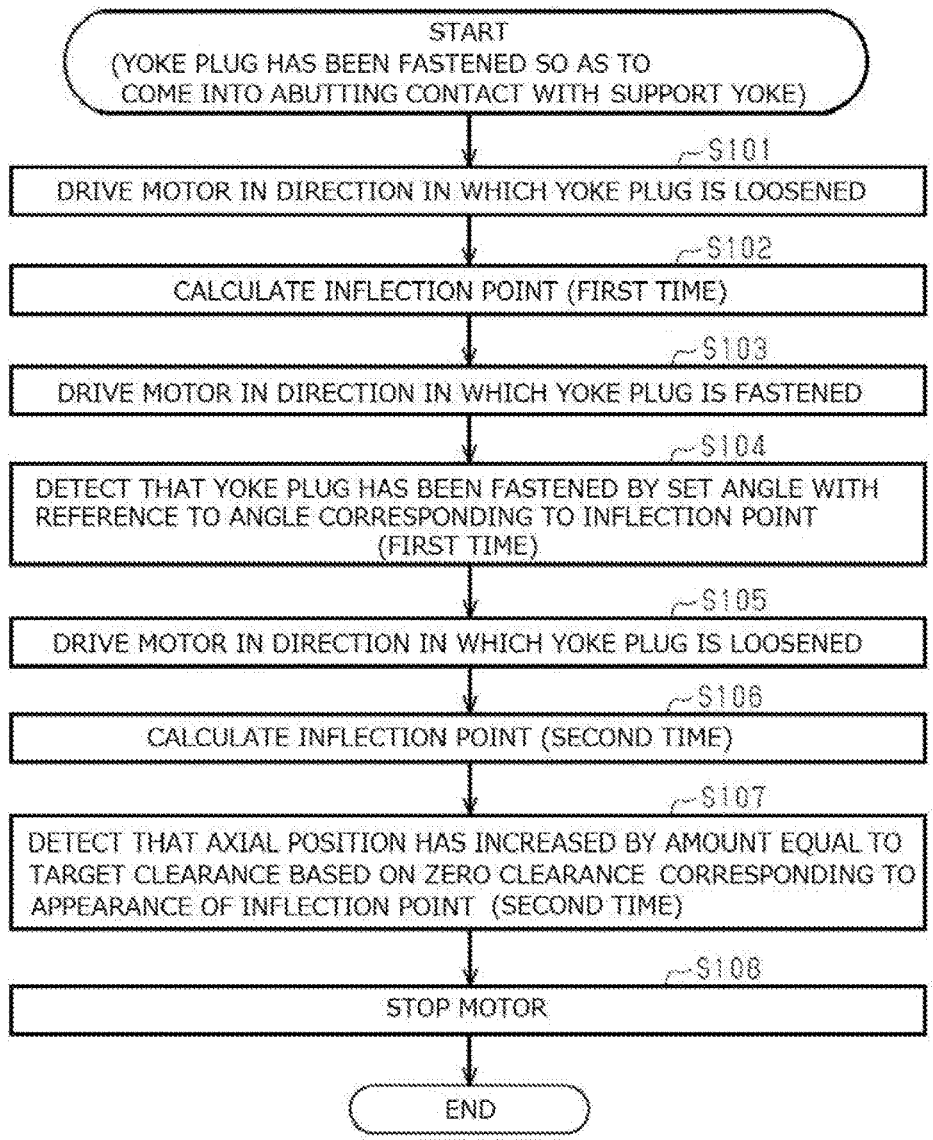
FIG. 5 is a flowchart illustrating an adjustment procedure for the steering system.

As illustrated in a flowchart in FIG. 5, the control apparatus 71 drives the motor 44 in a direction in which the temporarily fastened yoke plug 22 is loosened (step S101). The rotation speed of the motor 44, that is, the rotation speed of the yoke plug 22, is constant.

Figure 6:
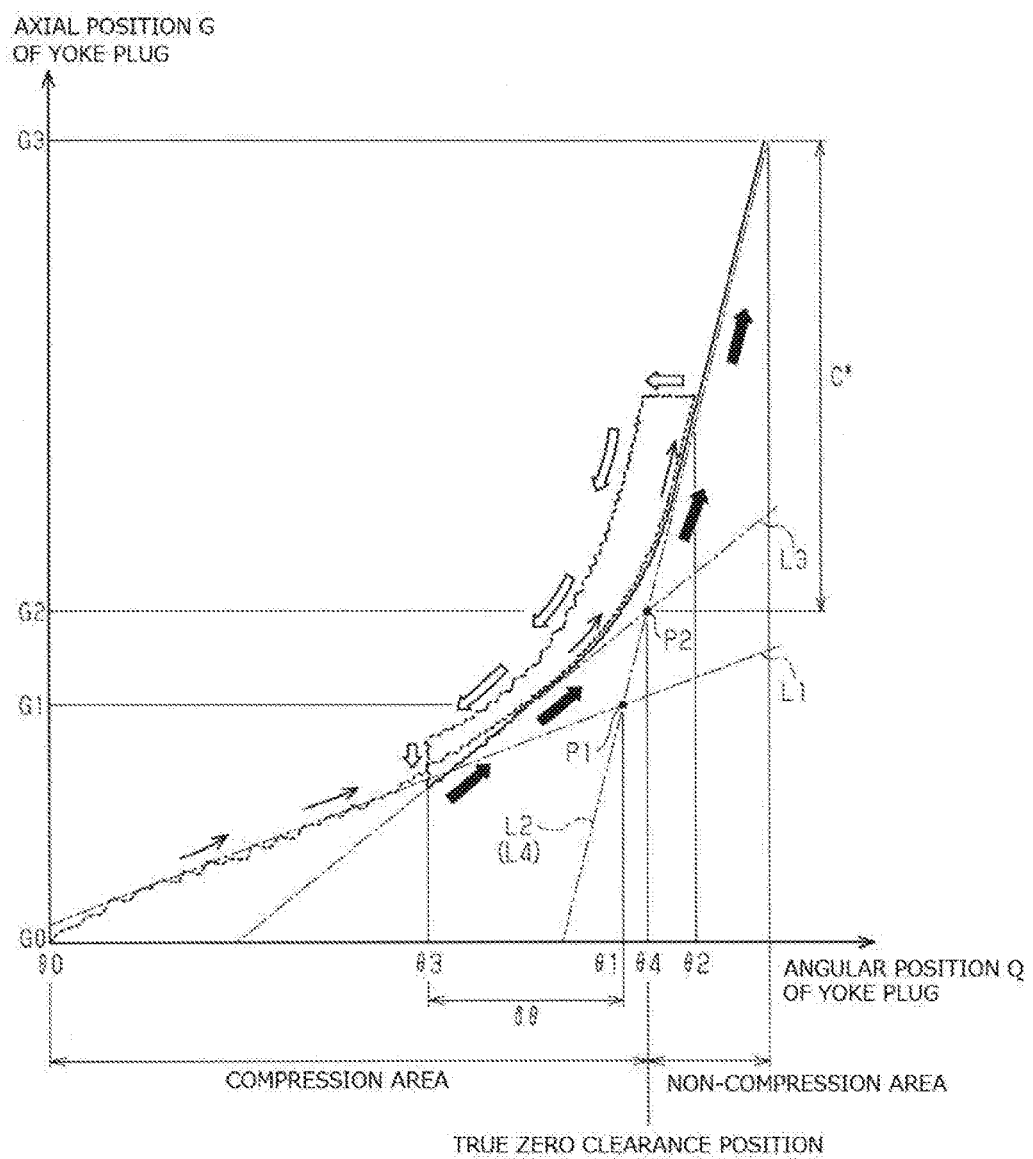
FIG. 6 is a graph illustrating a relationship between the angular position of a yoke plug and the axial position of a support yoke.

FIG. 6 is a graph representing the relationship between the angular position θ of the yoke plug 22 to the housing 11 and the axial position G of the yoke plug 22 with reference to the support yoke 21. In the graph, for the angular position θ of the yoke plug 22, a change in a negative direction indicates that the yoke plug 22 is fastened, and a change in a positive direction indicates that the yoke plug 22 is loosened.

As depicted by a dashed line in the graph in FIG. 6, as the angular position θ of the yoke plug 22 increases from an angular position θ0 obtained during the temporary fastening, the axial position G of the yoke plug 22 generally tends to increase linearly with a slight fluctuation. However, this increase in axial position G results from gradual release of compressive deformation (distortion) of the support yoke 21. The rate of the change in axial position G with respect to the change in angular position θ has a smaller value than the rate varying according to the screw pitch of the external thread portion 22b in a normal state. That is, the change gradient of the axial position G with respect to the increase in angular position θ is gentler than the change gradient in the normal state.

When the yoke plug 22 is further loosened, the change gradient of the axial position G with respect to the increase in angular position θ increases sharply in a circular arc pattern and eventually increases linearly with respect to the increase in angular position θ. At this time, the change gradient of the axial position G with respect to the increase in angular position θ varies according to the screw pitch of the external thread portion 22b of the yoke plug 22. This indicates that the compressive deformation of the support yoke 21 is released.

As depicted in the flowchart in FIG. 5, the control apparatus 71 then calculates an inflection point P1 (first time) (step S102). The inflection point P1 is a boundary point where the change gradient of the axial position G. The control apparatus 71 determines two regression lines (approximate lines) L1 and L2 depicted by a long dashed short dashed line in the graph in FIG. 6, for example, using the least-square method based on the angular position θ and the axial position G. The regression line L1 represents the changing trend of the axial position G in a compression area where the axial force of the yoke plug 22 acts on the support yoke 21. The regression line L2 represents the changing trend of the axial position G in a non-compression area where the compressive deformation of the yoke plug 22 is released to allow the axial position G to change according to the screw pitch of the external thread portion 22b. The control apparatus 71 temporarily stores the intersection point between the regression lines L1 and L2 as the inflection point P1.

When the angular position θ of the yoke plug 22 reaches an angular position θ1 corresponding to the inflection point P1, it can be assumed that the yoke plug 22 is located at the zero clearance position. Thus, the clearance C may be adjusted with reference to this position. Compared to the conventional technique that adjusts the clearance C using the screw-thread position of the yoke plug 22 during the temporary fastening as the zero clearance position, the present embodiment enables a more appropriate clearance C to be set. This is because the amount of compressive deformation of the support yoke 21 (in this case, an axial position G1 corresponding to the inflection point P1 with reference to an axial position G0 obtained in the temporarily fastened state) is excluded from the adjusted clearance C.

However, for example, a temporary fastening toque varies according to product specifications or the like, and thus, the fluctuation range of the change in axial position G with respect to the change in angular position θ in the compression area is expected to increase with an increase in the temporary fastening torque. Furthermore, even among the same products, the state (the change gradient or the like) of the change in axial position G with respect to the change in angular position θ varies with an increase in the temporary fastening torque. Thus, a slight variation may occur in the inflection point P1 (zero clearance position) and therefore the amount of the clearance C calculated by the control apparatus 71.

Therefore, to further reduce variation in clearance C, the control apparatus 71 continues to execute the following process. As illustrated in the flowchart in FIG. 5, the control apparatus 71 calculates the inflection point P1 in the above-described step S102, and then drives the motor 44 in the direction in which the yoke plug 22 is fastened again (step S103).

As depicted in the graph in FIG. 6, fastening of the yoke plug 22 is started, for example, at a timing when the yoke plug 22 is loosened to an angular position θ2 with a value larger than the value of the angular position θ1 corresponding to the inflection point P1. As depicted by blank arrows in the graph in FIG. 6, the axial position G decreases with a decrease in the angular position θ.

As illustrated in the flowchart in FIG. 5, the control apparatus 71 then detects that the yoke plug 22 has been fastened by a set angle δθ (approximately 20°) with reference to the angular position θ1 corresponding to the inflection point P1 (S104). At this time, the angular position θ of the yoke plug 22 exhibits an angular position θ3 that is larger than the angular position θ0 obtained during the temporary fastening. The axial force acting on the support yoke 21 (the axial force of the yoke plug 22) is weaker than the axial force exerted during the temporary fastening. According to the weak axial force, the support yoke 21 is subjected to slight compressive deformation. Subsequently, the control apparatus 71 drives the motor 44 in the direction in which the yoke plug 22 is loosened again (S105).

As depicted by filled-in arrows in the graph in FIG. 6, the axial position G again increases linearly like a gentle slope with a slight fluctuation as the angular position θ of the yoke plug 22 increases. The increasing gradient of the axial position G in this case is slightly larger than the increasing gradient of the axial position G obtained when the temporarily fastened yoke plug 22 is loosened as depicted by a solid arrow in the graph in FIG. 6. This is because the amount of compressive deformation of the support yoke 21 is smaller than the amount of compressive deformation occurring during the temporary fastening. Subsequently, the axial position G increases in a circular arc pattern with the increase in the angular position θ and eventually increases linearly with the increase in the angular position θ.

As illustrated in the flowchart in FIG. 5, the control apparatus 71 then calculates the inflection point (second time) (S106). The control apparatus 71 determines two regression lines L3 and L4 depicted by a long dashed short dashed line in the graph in FIG. 6 using the least-square method as is the case with the above-described step S102. The regression line L3 represents the changing trend of the axial position G in the compression area similarly to the above-described regression line L1. However, the slope of the regression line L3 is slightly steeper than the slope of the above-described regression line L1. The regression line L4 represents the changing trend of the axial position G in the non-compression area similarly to the above-described regression line L2. The regression line L4 substantially matches the above-described regression line L2, and thus in the graph in FIG. 6, is denoted by a parenthesized reference numeral added to the regression line L2. The control apparatus 71 temporarily stores the intersection point between the regression lines L3 and L4 as an inflection point P2.

As illustrated in the flowchart in FIG. 5, the control apparatus 71 then recognizes that the yoke plug 22 is located at the true zero clearance position when the angular position θ of the yoke plug 22 reaches an angular position θ4 corresponding to the second inflection point P2. The control apparatus 71 then detects that the axial position G has increased by an amount equal to the target clearance C* with reference to an axial position G2 corresponding to the inflection point P2 (step S107). Specifically, as illustrated in the graph in FIG. 6, an axial position G3 is detected which reflects a value resulting from addition of the target clearance C* to the axial position G2 corresponding to the inflection point P2.

Thus, a more accurate inflection point P2 is calculated by temporarily releasing the axial force on the support yoke 21, fastening the yoke plug 22 more loosely than during the temporary fastening, and loosening the yoke plug 22 again. When the angular position θ corresponding to the second inflection point P2 is reached, the yoke plug 22 is positioned even closer to the true zero clearance position. This is because the amount of compressive deformation of the support yoke 21 (the difference between the axial position G0 in the temporarily fastened state and the axial position G2 corresponding to the inflection point P2) is excluded from the adjusted clearance C. The yoke plug 22 is loosened by the target clearance C* with reference to the position more approximate to the true zero clearance position so that the clearance C can be made even closer to the target clearance C*. Thus, a more appropriate clearance C can be achieved.

Finally, the yoke plug 22 is fixed to the housing 11. If the yoke plug 22 used is of a self-lock type, the fixation to the housing 11 is completed when the adjustment of the clearance C is completed. The self-lock type refers to a type in which the yoke plug 22 is shaped like an imperfectly circular cylinder and a threaded portion formed on an outer peripheral surface of the yoke plug 22 is fixed by friction caused by fastening the threaded portion. If the yoke plug 22 without a self-lock function is used, the yoke plug 22 is fixed to the housing 11 by caulking the yoke plug 22 or applying an adhesive to the yoke plug 22 after the adjustment operation for the clearance C is completed. The assembly operation for the steering system 10 is thus completed.

Therefore, the present embodiment can produce the following effects.

(1) When the yoke plug 22 is loosened which has been temporarily fastened to the degree that the support yoke 21 is subjected to elastic compressive deformation, the yoke plug 22 is loosened to the position where the axial position G of the yoke plug 22 reaches the target clearance C* using, as a reference, the position where the rate of change in the axial position G of the yoke plug 22 with respect to the change in the angular position θ of the yoke plug 22 increases rapidly. Thus, the clearance C can be made even closer to the target clearance C*. Therefore, a more appropriate clearance C can be set. A variation in clearance C among the products can be suppressed.

(2) Depending on the magnitude of the temporary fastening torque, the clearance C can be adjusted using the first-time inflection point P. A higher adjustment accuracy for the clearance C can be achieved when the temporary fastening torque has a smaller value. This is because the axial force of the yoke plug 22 exerts a smaller effect (a smaller amount of compressive deformation) on the adjustment accuracy for the clearance C.

(3) When the temporarily fastened yoke plug 22 is loosened, behavior exhibited by the support yoke 21 when the elastic compressive deformation of the support yoke 21 is released varies even among the same products. Consequently, the first-time inflection point P may vary. Thus, the yoke plug 22 is fastened more loosely than during the temporary fastening using the inflection point P as a reference. With the axial force on the support yoke 21 being lower than the axial force exerted during the temporary fastening, the yoke plug 22 is loosened again, and the second-time inflection point P2 is calculated. The second-time inflection point P2 is more accurate than the first-time inflection point P1. Thus, the clearance C is adjusted using the second-time inflection point P2 as a reference so that a more appropriate clearance C can be set.

(4) Since a more accurate zero clearance position (inflection point P2) is determined, the clearance C can be set to as large a value as possible within an acceptable range in a pinpoint manner. A small clearance C may increase a needed steering torque. In this regard, by increasing the clearance to the vicinity of the limit of the acceptable range, it is possible to suppress an increase in steering torque.

(5) A more accurate zero clearance position is used as a reference to enable the clearance C to be more easily and more quickly adjusted.

(6) The rotating socket 48 is divided into three pieces. That is, the rotating socket 48 has the socket member 51 that allows the yoke plug 22 to be rotated, the reference member 52 that serves as a reference for measurement of the axial position G of the yoke plug 22, and the gauge head 53. The socket member 51, the reference member 52, and the gauge head 53 are independent of one another. The reference member 52 can move independently of the socket member 51 without being affected by movement of the socket member 51. This prevents the state of contact between the reference member 52 and the yoke plug 22 from being fluctuated under the effect of the movement of the socket member 51. Therefore, the axial position G of the yoke plug 22 can be more accurately detected.

(7) When the graph depicted in FIG. 6 is displayed on the monitor 72, an operator can visually check changes in axial position G with respect to the angular position θ, the zero clearance position (inflection points P1 and P2), and the like.

The above-described embodiment may be modified into another embodiment. That is, an electric power steering system (EPS) can be constructed by providing the steering system 10 with an assist motor that is a source of a steering assist force.

What is claimed is:

1. A method for adjusting a steering system by using an adjustment apparatus,
    the steering system including: a rack shaft that makes linear motion inside a housing; a pinion shaft rotatably supported by the housing to mesh with the rack shaft; a support yoke housed in a guide hole provided in the housing so as to be able to move back and forth along the guide hole and supporting the rack shaft so as to allow the rack shaft to slide along an axial direction of the rack shaft; a yoke plug screw-threaded in the guide hole; and a bias member interposed between the yoke plug and the support yoke to bias the support yoke toward the rack shaft,
    the adjustment apparatus including: a motor; a rotating socket that rotates together with the yoke plug in conjunction with the motor; a rotation sensor; a displacement sensor; and a control apparatus, and
    the method comprising:
    temporarily fastening the yoke plug such that the support yoke is subjected to a first elastic compressive deformation;
    detecting, by the displacement sensor, an axial position of the yoke plug with reference to the support yoke;
    detecting, by the rotation sensor, an angular position of the yoke plug;
    controlling, by the control apparatus, the motor based on detection results from the rotation sensor and the displacement sensor to adjust a clearance between the support yoke and the yoke plug to reach a target clearance by loosening the yoke plug, which has been temporarily fastened, to a position where the axial position of the yoke plug reaches a target clearance between the support yoke and the yoke plug, wherein
    the position where the axial position of the yoke plug reaches the target clearance is based on a position where a rate of a change in the axial position of the yoke plug with reference to the support yoke increases rapidly with respect to a change in the angular position of the yoke plug, and
    in the loosening of the yoke plug, the yoke plug is loosened by using, as a reference for adjusting the clearance, the position where the rate of the change in the axial position of the yoke plug with reference to the support yoke increases rapidly with respect to the change in the angular position of the yoke plug, such that adjustment of the clearance is based on a relationship between the angular position of the yoke plug and the axial position of the yoke plug.

2. The method for adjusting a steering system according to claim 1, the method further comprising:
    when using, as the reference, the position where the rate of the change in the axial position of the yoke plug increases rapidly, fastening the yoke plug to a degree that the support yoke is subjected to a second elastic compressive deformation, the second elastic compressive deformation being less than the first elastic compressive deformation corresponding to the temporary fastening, and then loosening the yoke plug again; and
    in the loosening of the yoke plug again, the yoke plug is loosened to the position where the axial position of the yoke plug reaches the target clearance, using, as the reference, a position where the rate of the change in the axial position of the yoke plug again increases rapidly with respect to the change in the angular position of the yoke plug.

3. The method for adjusting a steering system according to claim 1, the method further comprising:
    detecting, by the displacement sensor, the axial position of the yoke plug, reflecting a boundary point where the rate of the change in the axial position increases rapidly, as a position corresponding to an intersection point between an approximate line set along a changing trend of the axial position before the rapid increase and an approximate line set along the changing trend of the axial position after the rapid increase.

4. The method for adjusting a steering system according to claim 2, the method further comprising:
    detecting, by the displacement sensor, the axial position of the yoke plug, reflecting a boundary point where the rate of the change in the axial position increases rapidly, as a position corresponding to an intersection point between an approximate line set along a changing trend of the axial position before the rapid increase and an approximate line set along the changing trend of the axial position after the rapid increase.

* * * * *